Patented Nov. 8, 1932

1,887,349

UNITED STATES PATENT OFFICE

WILLIAM A. HAMMOND, OF YELLOW SPRINGS, OHIO

DRYING AGENT AND PROCESS OF MANUFACTURING SAME

No Drawing.   Application filed April 30, 1931.   Serial No. 534,148.

This invention relates to drying or desiccating agents and the process of manufacturing same and has for its primary object to provide a material having suitable physical and chemical properties to render it an efficient agent for the removal of water from other materials.

A further object of the invention is to provide a desiccating agent which may be manufactured from inexpensive materials and which may be regenerated to its original state after use.

Further objects and advantages will become apparent as the description proceeds.

In ordinary laboratory practice, (either routine or research), in the manufacture of certain materials, and in the control of humidity in chambers, vaults and buildings, it is frequently necessary to remove water from gases, liquids or solids, or to regulate the water or moisture content thereof. Such removal of water from other materials is usually accomplished by the use of one or more substances known variously as dehydrating agents, desiccating agents, or drying agents, and the specific physical and chemical properties of a given drying agent must usually be considered in connection with each particular drying operation.

The present drying agent consists of a form of sulphate of lime, or calcium sulphate, prepared from such original material and by such a process as will cause it to contain water, chemically combined in the form of water of hydration in amounts varying from 0 to 6.6 per cent by weight, and to possess the desirable physical and chemical properties which render it an efficient agent for the removal of water from other materials.

In preparing the drying agent, I prefer to use the snow-white natural mineral calcium sulphate dihydrate, known as gypsum, which contains approximately 20.9 per cent of water of hydration and which is practically free from foreign materials or impurities. However, good results may be obtained when a more crude gypsum is used, that is, a natural gypsum which has associated with it such natural materials as limestone, shale, clay, or other mineral substances. Also, good results may be obtained when the drying agent is prepared from the plaster of Paris casting moulds, new or old, used in the casting of ceramic bodies, from any set plaster of Paris mould, form, or casting, from plaster of Paris itself or commercial calcined gypsum, or from many of the so-called industrial by-products which contain appreciable percentages of hydrated calcium sulphate.

Having selected a suitable form of calcium sulphate as a raw material, I proceed to reduce the material to suitable physical form and size. When a natural mineral, or any form of cast set plaster of Paris, or calcined gypsum is used, the material is first cleaned and dried, after which it is crushed in a crusher designed to yield either a mixture of granules of all sizes from dust up to a predetermined maximum size, or a maximum proportion of some particular size with a minimum proportion of other sizes of granules. The crushed material is then screened through a series of screens; each screen in the series having successively smaller openings, such as 1, 1/2, 1/4, 1/6, 1/8, 1/10, 1/20 inch. This process of screening yields portions of the original material in the form of fairly uniformly sized granules, and a mixture of coarse and fine powder.

When plaster of Paris or commercial calcined gypsum is used as the original material, the dry plaster of Paris or calcined gypsum may be mixed with water to form a paste, and this paste formed, cast, or extruded in the form of pieces, such as cylinders, cubes, etc., of any desired size and allowed to set and dry. My drying agent may be alternatively prepared directly from plaster of Paris or commercial calcined gypsum without wetting and casting, in which case the drying agent will be in the form of powder.

By the above described processes any form of calcium sulphate dihydrate (such as select or crude mineral gypsum, plaster of Paris casting moulds, casts or forms, plaster of Paris or commercial calcined gypsum itself) may be reduced or converted into uniformly sized granules or pieces or into powder as desired. With the physical form and size determined, it remains to develop in the material other desirable physical properties and such chemical properties as will cause it to become an efficient drying agent.

The further physical and chemical properties desired in an efficient drying agent are imparted to the above described material by a carefully controlled heat treatment. When calcium sulphate in any of the above-mentioned forms is heated, the water of hydration is expelled. The expulsion of the first three-fourths of the total water of hydration of the dihydrate (gypsum or plaster of Paris moulds) yields the ordinary plaster of Paris or commercial calcined gypsum, known as the half-hydrate. The expulsion of the last one-fourth of the total water of hydration of the dihydrate, or the expulsion of the total water of hydration of the half-hydrate, yields a product known as anhydrous calcium sulphate. This process of dehydration or expulsion of the water of hydration is not accompanied by any appreciable change in volume of the individual granules or particles; the dehydrated granule or particle is, therefore, permeated by fine pores. Furthermore, the process of dehydration while causing some lowering, by no means destroys, the resistance of the granules or particles to crushing and abrasion. The material may therefore be used and handled repeatedly without appreciable change in its granular form.

The chemical properties of anhydrous calcium sulphate, particularly with respect to its reactions with water, vary widely with the temperature and duration of heating used in its preparation. When heated at temperatures and for periods of time which are sufficient to effect practically complete dehydration, but below about 300 degrees centigrade, the product shows an extremely high chemical affinity for water. This product reacts instantaneously with water, liberating heat, and reverts to the form of the half-hydrate. The avidity with which this form of anhydrous calcium sulphate reacts with water to form the half-hydrate renders it a drying or desiccating agent of the highest efficiency. Thus, moist air or other gases allowed to stand or pass in contact with granules of the material are rendered practically free from water vapor. The water vapor remaining in air after drying in this way at 25° C. has been found to be only approximately 0.004 milligrams per liter. A moist solid stored in a sealed container such as a desiccator, or in any chamber or room, large or small, in which is placed a proper amount of this drying agent, will lose water rapidly and soon become practically completely dry. When a proper amount of the granules or powdered material is added to a non-aqueous or organic liquid containing water, as for example ordinary 95% ethyl alcohol, an instantaneous rise in temperature is noted and upon filtration or distillation the liquid is found to be practically free from water.

On the other hand, when the heating of the dihydrate or half-hydrate is carried to temperature above about 300° C. for considerable periods of time, the product no longer possesses a strong affinity for water. Such a product rehydrates more slowly or not at all, and is accordingly useless as a drying or desiccating agent.

The rate of dehydration varies directly with the temperature. For example, when heated in ordinary air the dihydrate begins to lose water very slowly at slightly above 100° C., while the dehydration goes on actively only at temperatures approximating 160° to 170° C. and proceeds at a rate which is economically satisfactory at 230° to 250° C. Temperatures up to slightly above 300° C. may be used, but with increasing liability of overheating.

In practice I have found that when either the powdered or granular dihydrate is heated at 230° to 250° C. for about two hours the product obtained is practically completely dehydrated and has a very strong affinity for water, thus making it an excellent drying or desiccating agent. This heat treatment may be carried out by spreading the granules or powder in uniform layers, preferably ½ inch to 2 inches deep, in iron or other suitable pans or trays and heating in a gas or electric oven or other suitable oven or heating device.

The action of dehydration of the calcium sulphate dihydrate may be greatly expedited by passing a current of dry air over the material or by passing a current of moist air heated to such a degree that its vapor content is lower than the saturation point, so that it is still capable of receiving moisture from the calcium sulphate rather than passing moisture to it.

Since the anhydrous calcium sulphate prepared as described above has a very strong affinity for water either in the liquid or vapor form, the freshly prepared material must be protected from exposure to moist air. The product will not combine with water above, say, 200° C. It has therefore been found best to place the freshly dehydrated material in strong sealed containers while still at a temperature of approximately 200° C. I have found it desirable in handling large batches to place the hot material in vessels provided with inlet tubes through which dry air may be admitted as the material cools and the surrounding air contracts. When cooled, the material may be transferred rapidly and with proper precautions to suitable air-tight containers, as bottles, cans or drums, in which it may be stored indefinitely for use as required.

The drying agent prepared as described above has a capacity for combining chemically with approximately 6.6 per cent of its weight of water while acting efficiently as a drying agent. Since the product formed by the absorption of this amount of water is a relatively stable hydrate, namely, the half-hydrate, the rate of absorption and the drying efficiency of the drying agent is maintained uniform until practically this amount of water is absorbed. When this amount of water has been absorbed, the drying agent becomes inactive and ineffective. However, by reheating exactly as in the original preparation, namely, for about two hours at about 230° to 250° C., the material is entirely regenerated and its drying efficiency and capacity are restored. This regeneration of the exhausted drying agent may be repeated indefinitely without noticeable loss in drying efficiency or appreciable alteration of its granular form or strength.

What I claim is:

1. The process of manufacturing a drying agent which consists in reducing calcium sulphate dihydrate to calcium sulphate half-hydrate, and subsequently heating the half-hydrate at a temperature less than 300° C. to form a highly porous calcium sulphate substantially free from water of hydration.

2. The process of manufacturing a drying agent which consists in heating hydrated calcium sulphate at approximately 230° to 250° C. for a length of time sufficient to effect practically complete dehydration.

3. The process of manufacturing a drying agent which consists in heating hydrated calcium sulphate in granular form for about two hours at a temperature between 230° C. and 250° C. to effect practically complete dehydration and produce a porous product without materially altering the size or form of the granules.

4. As a new drying agent, substantially completely dehydrated calcium sulphate having an affinity for water greater than that of ethyl alcohol.

5. As a new drying agent, granules of substantially completely dehydrated calcium sulphate having an affinity for water greater than that of ethyl alcohol.

In testimony whereof I have hereunto signed my name to this specification.

WILLIAM A. HAMMOND.